M. A. SNYDER.
BAKER'S PEEL BOARD.
APPLICATION FILED DEC. 15, 1920.
1,410,419.
Patented Mar. 21, 1922.
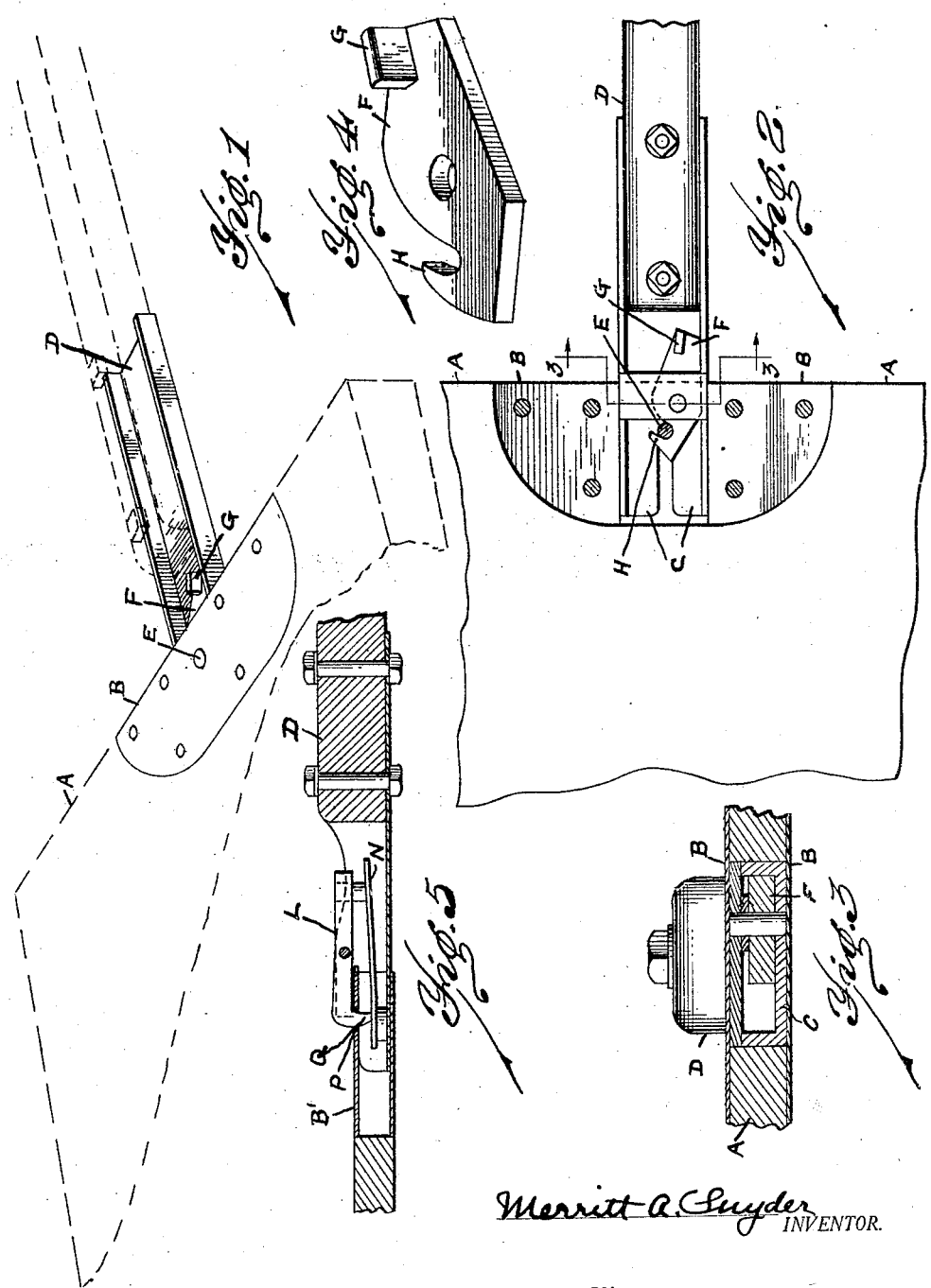
Merritt A. Snyder
INVENTOR.
BY
William M. Sewan
ATTORNEY.

UNITED STATES PATENT OFFICE.

MERRITT A. SNYDER, OF DETROIT, MICHIGAN.

BAKER'S PEEL BOARD.

1,410,419.	Specification of Letters Patent.	Patented Mar. 21, 1922.

Application filed December 15, 1920. Serial No. 430,947.

*To all whom it may concern:*

Be it known that I, MERRITT A. SNYDER, a citizen of the United States, residing at Detroit, in the county of Wayne, State of Michigan, have invented a certain new and useful Improvement in Bakers' Peel Boards, and declare the following to be a full, clear, and exact description of the same, such as will enable others skilled in the art to which it pertains to make and use the same, reference being had to the accompanying drawings, which form a part of this specification.

This invention relates to peel-boards for bakers' use and has for its object an improved device of this class adapted to permit the arrangement of the loaves of bread, after they have been kneaded and shaped, upon the peel-boards, where they are to be allowed to stand for rising, and before being put in the oven; a number of peel-boards being thus capable of being covered with loaves of dough and spread out in relatively compact relation, and without handles, until the dough loaves are ready for insertion in the oven where they are to be baked by being suspended upon racks or gratings, rather than being cooked in pans, as heretofore, so that all sides of the exterior of the loaf are equally subjected to the action of the heat. When the loaves are to be inserted on the grating, a handle is attached to the peel-board which is thrust into the oven and the loaves roll off onto the grating, the peel-board being then withdrawn and the handle being detached from the board for use with another board whose load of loaves is ready for placing in the oven. This attachability and detachability of the handle is thus a prime requisite to avoid jarring off of the loaves as the handle is attached, and at the same time to insure a firmness of attachment of the handle in the board so that the board will not become loose and slip off inside the oven.

To effect these desirable results, I have designed the improved construction herein disclosed.

In the drawings, Figure 1 is a perspective view of a peel-board (indicated in dotted lines) with its handle in place relatively thereto;

Figure 2 is a plan view, with part of one face-plate cut away;

Figure 3 is a sectional view along the line 3—3 of Figure 2, looking in the direction of the arrows;

Figure 4 is a perspective of my preferred form of catch; and

Figure 5 is a partly sectional side view of a slightly modified form of catch.

A indicates the flat peel-board, which is preferably of tapered or wedge-shaped contour like a shingle, the top or thickest edge of which is cut away or at least built out from the edge of the board at this point somewhat by the presence of the sheet metal facing plates, B, which leave a space between them of just sufficient breadth for the insertion of the bifurcated end, C, preferably although not necessarily of metal, of the handle D. The bifurcated portions of the handle end preferably fit about the post or pin E, which extends from one of the facing plates to the other. The fit of this bifurcated handle between the facing plates is so snug that under many circumstances the handle and board would remain assembled; but to guard against the possible detachment of the board from the handle when a quick jar or jerk is given to it to place the loaves on the oven grating, I provide a pivoted catch piece F which is located on the bifurcated portion of the handle adjacent the inner end of the bifurcation, so that when the handle has been thrust into the space between the facing plates, B, the tip or hook H of the catch may be thrust into locking engagement about the post E by a slight finger pressure upon the rear projection G thereof.

The handle and board are now so firmly associated that accidental detachment of the board is impossible, and yet when the empty board has been withdrawn, the actuation of the catch so as to disconnect its hook portion H from the post E is easily accomplished, and the now easily detachable board may be placed in a convenient compact pile with others for ready re-use.

In Figure 5 I have illustrated a slightly modified form of my invention, in which the pivoted catch piece L is yieldingly held, by means of the spring N, so that its hooked end Q engages in the slot P in one of the facing plates B'. The portion of the facing plate between the slot and the adjacent edge is thus made to serve the same purpose as the post E in the other form shown.

While especially designed for the use described, it is of course obvious that the constructional features of my invention are equally adaptable to similar and analogous uses, such as pans, or even shovels; and I desire the scope of this disclosure to be understood accordingly.

What I claim is:

1. A baker's peel-board, having in combination with a terminally bifurcated handle, a pair of surface plates enclosing a cut-away portion of the board adjacent one edge thereof, between which said handle is adapted to slidably engage, a post extending through the space enclosed by said surface plates and adapted to be flanked by the bifurcated portion of the handle when inserted, and a pivoted catch member supported by said handle in position to assume a locking position relatively to said post, thereby detachably locking the handle to the board.

2. In combination with a board having a superficially enclosed recessed portion adjacent one edge, a post extending across said recessed portion transversely to the plane of the board, a terminally bifurcated handle adapted to removably engage in said recessed portion with its branches about said post, and a catch member pivotally supported on said handle adjacent said bifurcated portion, adapted to engage said post when the handle is in fully inserted position relatively to the board, thereby detachably locking the same thereto.

3. In combination with a terminally bifurcated handle, a catch member pivotally supported thereby, a board having a recessed portion in one edge into which said handle is adapted to closely engage, and an anchorage post extending across said recessed portion in position to be engaged by said catch, thereby detachably securing said handle to said board.

4. The combination, with a board having a recessed portion in one edge, of a post extending across said recessed portion, a terminally bifurcated handle adapted to fit snugly in said recessed portion with the bifurcated portions engaging on either side of said post, and a catch member carried by said handle in position to engage said post when the handle is in position in the recessed portion of the board, thereby detachably securing the handle to the board.

In testimony whereof, I sign this specification in the presence of two witnesses.

MERRITT A. SNYDER.

Witnesses:
WILLIAM M. SWAN,
EDWARD P. ECHLIN.